United States Patent [19]

Embo et al.

[11] Patent Number: 5,894,411
[45] Date of Patent: Apr. 13, 1999

[54] STACKABLE DATA CARRIER ARRANGEMENT

[75] Inventors: Georges Embo, Langemark; Edgard Acke, Oostkamp, both of Belgium; Peter Preiner, München; Helge Schmidt, Speyer, both of Germany

[73] Assignee: Siemens Aktiengesellschaft, Munich, Germany

[21] Appl. No.: 08/941,381

[22] Filed: Sep. 30, 1997

Related U.S. Application Data

[63] Continuation of application No. PCT/DE96/00551, Mar. 29, 1996.

[30] Foreign Application Priority Data

Mar. 31, 1995 [DE] Germany .................. 195 12 164

[51] Int. Cl.$^6$ .......................... H05K 1/11; H05K 1/14
[52] U.S. Cl. .................. 361/774; 361/742; 361/776; 361/792; 361/794; 361/803; 361/804; 174/255; 439/74
[58] Field of Search ........................ 361/735, 736, 361/742, 749, 751, 773, 774, 776, 784, 785, 790, 792, 794, 803, 804; 174/254, 255; 333/246, 247; 439/61, 62, 65, 69, 74, 75, 629–632, 941

[56] References Cited

U.S. PATENT DOCUMENTS

| | | | |
|---|---|---|---|
| 2,850,681 | 9/1958 | Horton | 361/774 |
| 2,926,340 | 2/1960 | Blain et al. | 439/61 |
| 3,219,886 | 11/1965 | Katzin | 439/69 |
| 3,414,892 | 12/1968 | McCormack et al. | 439/74 |
| 4,612,519 | 9/1986 | Gargini et al. | 361/803 |
| 4,734,825 | 3/1988 | Peterson | 361/792 |
| 5,110,298 | 5/1992 | Dorinski et al. | 439/65 |

Primary Examiner—Leo P. Picard
Assistant Examiner—John B. Vigushin
Attorney, Agent, or Firm—Herbert L. Lerner; Laurence A. Greenberg

[57] ABSTRACT

A stackable data carrier arrangement including a cardshaped carrier element, at least one integrated semiconductor circuit arranged on the carrier element, at least one external terminal arranged on the carrier element and connected to the semiconductor circuit for making electrical contact therewith, the external terminal being formed so as to circumscribe an edge area of the carrier element and having a respective terminal area on the edge area and adjoining opposite main areas of the carrier element, the terminal areas being electrically connected to one another, includes means defining two slots provided in the carrier element, the slots extending parallel to one another from the edge area into the carrier element to approximately the same extent as the external terminal arranged between the slots, so that a contact tooth bendable perpendicularly to the main areas of the carrier element is formed by the region of the carrier element situated between the slots.

5 Claims, 2 Drawing Sheets

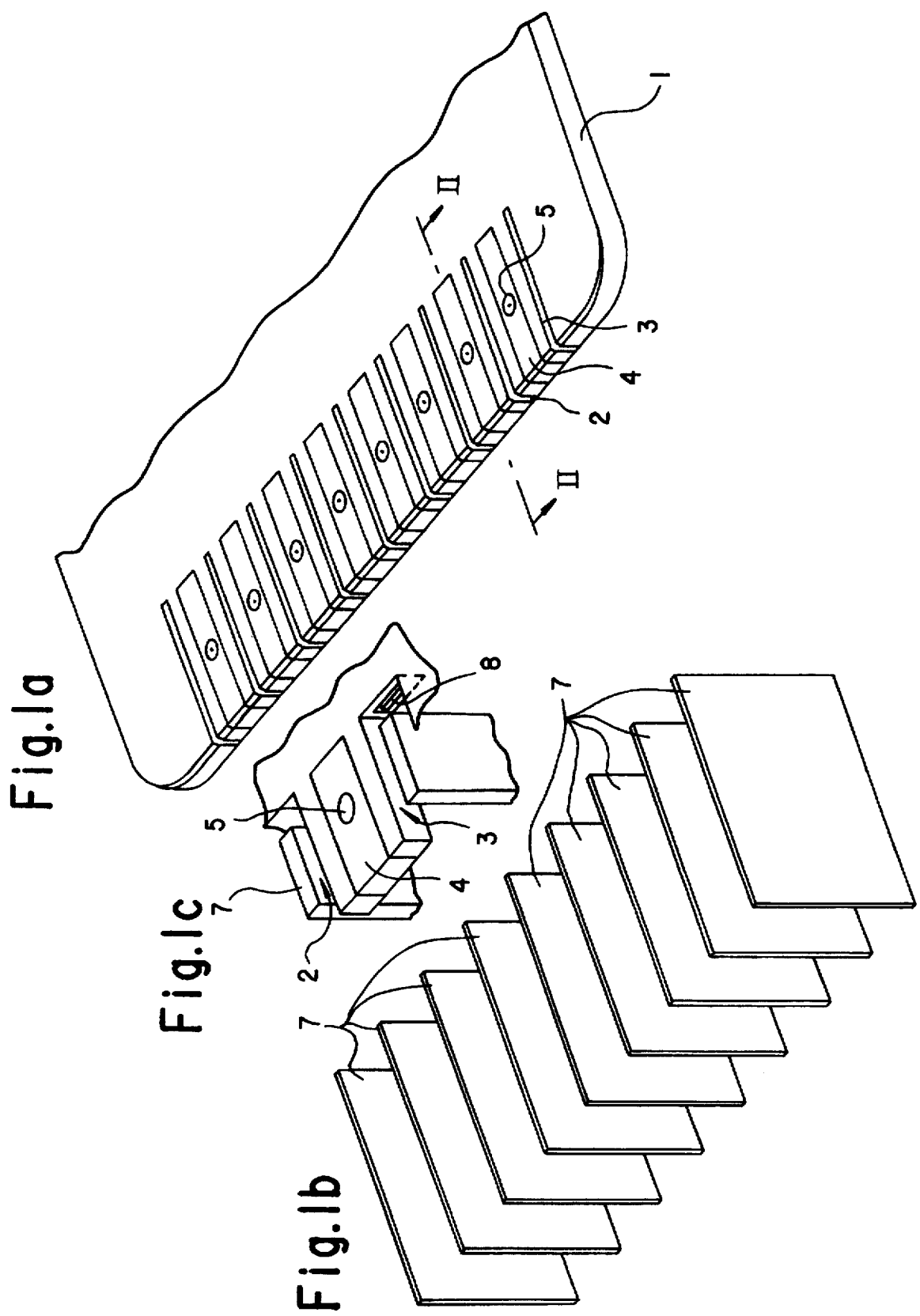

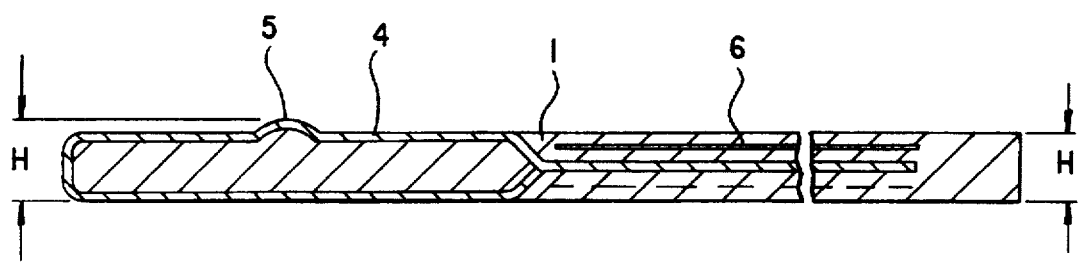
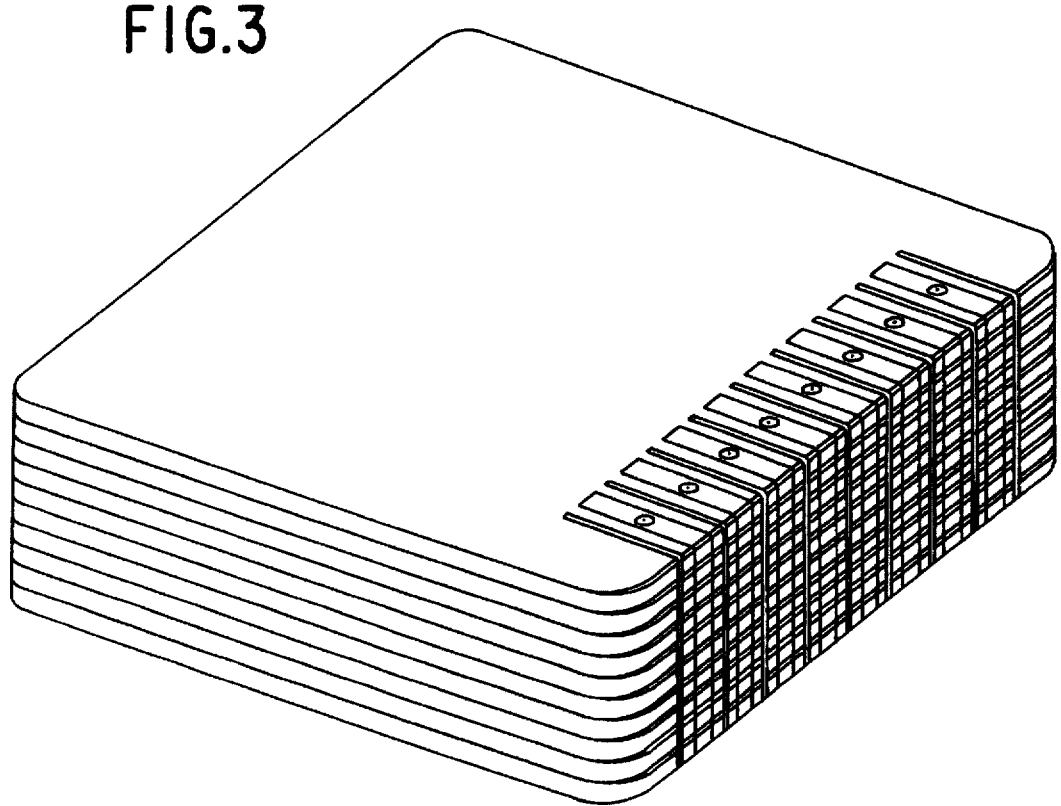

1

STACKABLE DATA CARRIER ARRANGEMENT

CROSS-REFERENCE TO RELATED APPLICATION

This application is a continuation of application Ser. No. PCT/DE96/00551, filed Mar. 29, 1996.

BACKGROUND OF THE INVENTION

Field of the Invention

The invention relates to a stackable data carrier arrangement including a cardshaped carrier element, at least one integrated semiconductor circuit arranged on the carrier element, at least one external terminal arranged on the carrier element and connected to the semiconductor circuit for making electrical contact therewith, the external terminal being formed so as to circumscribe an edge area of the carrier element and having a respective terminal area on the edge area and on adjoining opposite main areas of the carrier element, the terminal areas being electrically connected to one another.

An equipment plug connector of this general type has already been described in U.S. patent application Ser. No. 08/828,697 filed Mar. 31, 1997, a date which is later than the International priority date of Mar. 31, 1995 claimed for the instant application and consequently not prior art hereto, and is assigned to the same corporate assignee as that of the instant patent application. The special configuration of the external terminal enables a plurality of such cards to be placed on top of one another without any problems, so that a multiplicity of identical data carrier arrangements can be connected simultaneously to a processing device without any complicated additional auxiliary devices. Due to the fact that terminal areas are provided not only in an edge region of the card, but also, are provided electrically connected thereto, on the two main areas of the card, it is possible that the contacting of a plurality of cards placed on top of one another takes place directly in the stack, that is, without any further auxiliary devices, such as a contact rail in the processing device, for example.

The form of contact circumscribing an edge of the card is advantageously realizable from a production engineering standpoint. What is problematic, however, is tolerance adjustment between the various contact points when a plurality of cards are placed on top of one another. Even with flush or snug peripheral external terminals, height and/or thickness tolerances of several hundredths of a millimeter must always be expected from a production engineering standpoint. Depending upon the number of cards stacked upon one another, this rapidly results in a systematic defect which is no longer permissible. This is compounded by the fact that, preferably, eight external terminals are arranged next to one another on each card, which should, however, all ideally lie in one plane. A further problem that is a direct result of the stacking of the cards is that electromagnetic shielding of the memory cards from one another may be necessary.

It is accordingly an object of the invention to provide a stackable data carrier arrangement of the type described in the introduction hereto which is much improved with regard to these problems.

With the foregoing and other objects in view, there is provided, in accordance with the invention, a stackable data carrier arrangement including a cardshaped carrier element, at least one integrated semiconductor circuit arranged on the

2 carrier element, at least one external terminal arranged on the carrier element and connected to the semiconductor circuit for making electrical contact therewith, the external terminal being formed so as to circumscribe an edge area of the carrier element and having a respective terminal area on the edge area and adjoining opposite main areas of the carrier element, the terminal areas being electrically connected to one another, comprising means defining two slots provided in the carrier element, the slots extending parallel to one another from the edge area into the carrier element to approximately the same extent as the external terminal arranged between the slots, so that a contact tooth bendable perpendicularly to the main areas of the carrier element is formed by the region of the carrier element situated between the slots.

In accordance with another feature of the invention, the stackable data carrier arrangement includes a plurality of the external terminals arranged at regular intervals along the edge area, the external terminals, together with the respectively provided slots, forming respective contact teeth.

In accordance with a further feature of the invention, one of the main-area terminal areas is formed with a knob.

In accordance with an added feature of the invention, the stackable data carrier arrangement has a conical thickness so that the thickness, including the projecting knob height, on one side of a substantially parallelepipedal construction of the data carrier arrangement corresponds to the thickness on the opposite side thereof.

In accordance with a concomitant feature of the invention, the stackable data carrier arrangement includes a shield disposed in the carrier element, the shield extending in a plane wherein the carrier element extends, and shielding plates provided on an equipment side of the carrier element, the slots serving as receptacles for the shielding plates.

Other features which are considered as characteristic for the invention are set forth in the appended claims.

Although the invention is illustrated and described herein as embodied in a stackable data carrier arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 1a is a fragmentary perspective top and side view of the data carrier arrangement and part of the shield;

FIG. 1b is a perspective top and side view of part of a shielding for the data carrier arrangement;

FIG. 1c is a fragmentary perspective top and side view of the data carrier arrangement with the shielding disposed in position therein;

FIG. 2 is an enlarged longitudinal sectional view of FIG. 1a taken along the line II—II in the direction of the arrows; and FIG. 3 is a perspective top and side view of a through-contacted stack of cardshaped data carrier arrangements.

DESCRIPTION OF THE PREFERRED EMBODIMENTS

Referring now to the drawings and, first, particularly to FIG. 1, there is shown therein a data carrier arrangement having a carrier element 1 formed of plastic material, for example. Eight external terminals 4 arranged at regular intervals along an edge area or region are illustrated on a transverse side of the card. Each external terminal 4, together with respectively provided slots 2, 3, form a respective contact tooth. Consequently, each individual contact point can be bent independently of the other in a specific region.

As the stack height increases, it becomes more and more difficult to achieve reliable contact-making between a contact tooth of one card and that of an adjacent card. It is therefore advantageous if one of the main-area terminal surfaces is formed with a knob 5. The knob 5 presses against the surface of a card disposed thereon. The consequently requisite thickness adjustment is achieved by designing the thickness of the data carrier arrangement conically so that the thickness including the projecting knob height on one side of the substantially parallelepipedally formed data carrier arrangement corresponds to the thickness on the opposite side thereof, as is indicated diagrammatically in FIG. 2. This design is simple to manufacture by correspondingly configuring the injection mold for the card, the tolerances being non-critical in this case.

At high data rates, electrical shielding of the card is necessary in order to prevent the loss of data or the influencing of the data of a passive card by an adjacent active card. This can be achieved advantageously by applying an electrically conductive sheet 6 on one or both sides under the final card surface (cover sheet or foil), as shown in FIG. 2. Contact can be made between the shield in the card and the device either via a separate pin (tooth) and/or in the slots (interspaces between the contacts) with the shielding plates 7 on the socket side, as is indicated in FIG. 1c. In the latter case, corresponding shielding blades 7 from the socket or receptacle location for the memory card engage in the slots 2, 3 of the memory card and establish the contact 8 with the shield 6 in the memory cards. Incidentally, it can also be discerned in FIG. 2 that the lead frame on which the memory chip is fastened is passed integrally out of the carrier element 1 and returned as the peripheral external terminal 4.

The cards of the stack, if necessary or desirable, can lie on top of one another congruently or in-register only with the card on which the contact areas provided for electrical contact-making are arranged. It is therefore possible, for example, for half and whole cards to alternate in the stack. Likewise, dummy or bus amplifier cards may be inserted into the stack.

An adequate bendability of the contact teeth is also provided in designs wherein the slots 2, 3 are not formed continuous from one main area to an opposite main area, but rather, wherein a thin connection and skin, respectively, of about 0.2 mm thickness or less remains between the contact teeth. This connection may be a straight connecting web or, for example, also a bead-like bellows. The connection may be to one of the two main areas, that is to say at the top or bottom, or may be arranged approximately in the middle between those areas. The connection may also be completely or partially stamped or embossed in the longitudinal direction, i.e., into the carrier element.

We claim:

1. A stackable data carrier arrangement including a card-shaped carrier element, at least one integrated semiconductor circuit arranged on the carrier element, at least one external terminal arranged on the carrier element and connected to the semiconductor circuit for making electrical contact therewith, the external terminal being formed so as to circumscribe an edge area of the carrier element and having a respective terminal area on the edge area and adjoining opposite main areas of the carrier element, the terminal areas being electrically connected to one another, comprising means defining two slots provided in the carrier element, said slots extending parallel to one another from the edge area into the carrier element to approximately the same extent as the external terminal arranged between said slots, so that a contact tooth bendable perpendicularly to the main areas of the carrier element is formed by the region of the carrier element situated between said slots.

2. The stackable data carrier arrangement according to claim 1, including a plurality of the external terminals arranged at regular intervals along the edge area, said external terminals, together with said respectively provided slots, forming respective contact teeth.

3. The stackable data carrier arrangement according to claim 1, wherein one of the main-area terminal areas is formed with a knob.

4. The stackable data carrier arrangement according to claim 3, having a conical thickness so that the thickness, including the projecting knob height, on one side of a substantially parallelepipedal construction of the data carrier arrangement corresponds to the thickness on the opposite side thereof.

5. The stackable data carrier arrangement according to claim 1, including a shield disposed in the carrier element, said shield extending in a plane wherein the carrier element extends, and shielding plates provided on an equipment side of the carrier element, said slots serving as receptacles for said shielding plates.

* * * * *